Aug. 1, 1967   A. H. REUTHER   3,333,530

MULTIPLE DOMESTIC APPLIANCE COMBINATION

Filed Oct. 11, 1965

INVENTOR.
Albert H. Reuther

United States Patent Office 3,333,530
Patented Aug. 1, 1967

3,333,530
MULTIPLE DOMESTIC APPLIANCE
COMBINATION
Albert H. Reuther, Dayton, Ohio, assignor to General
Motors Corporation, Detroit, Mich., a corporation of
Delaware
Filed Oct. 11, 1965, Ser. No. 494,598
The entire term of the patent has been dedicated
to the Public
15 Claims. (Cl. 99—339)

This invention relates to domestic appliances, and more particularly, to combination self-cleaning oven as well as waffle-maker and/or toaster means.

A multi-purpose domestic appliance combination in accordance with the present invention has advantages of cost savings and minimum space requirement. A compact assembly of multiple appliance means provides a unit with sales appeal particularly for customers having only limited kitchen space such as in apartments and/or smaller homes. Also, problems of manually cleaning away spilled waffle batter and/or crumbs are avoided for auxiliary appliance means provided in combination with a self-cleaning oven means. The features of the present invention will appeal to newly weds and families where excessive waffle batter as well as burned toast particles or crumbs need not be a worry concerning clean up of auxiliary appliance means. Accordingly, an object of the present invention is to provide a new and improved combination waffle-maker and self-cleaning oven means having features to increase convenience, save cost and reduce cleaning time regardless of extent of culinary experience of a consumer.

Another object of this invention is to provide an electric waffle-maker portion in combination with an electric self-cleaning oven means. Preferably the waffle-maker portion has at least a portion of oven space in which electric self-cleaning operation will simultaneously effect removal of waffle batter which often is spilled or overflows during waffle making.

Another object of this invention is to provide an electric waffle-maker portion slidable in back and forth positioning on track means provided inside a self-cleaning electric oven compartment in combination therewith. The waffle-maker portion is movable upon opening of oven door means into a position to facilitate waffle batter pouring access though returnable into a recessed positioning that permits closure of the oven door means. Also the oven door means has a safety latch dependent upon self-cleaning oven control at higher temperature operation during which waffle batter is simultaneously disintegrated with electric oven cleaning.

A further object of this invention is to provide a multiple domestic appliance combination including self-cleaning electric oven means, waffle-maker portion and toaster portion supplemental to the self-cleaning electric oven means. The toaster portion has a floor or bottom area which is displaceable upon operation of mechanism to shift an insulation segment of oven liner insulation housing so that consumable particles drop directly from the toaster portion into the self-cleaning electric oven means subject to high temperature energization during which time both the particles and oven cleaning disintegration occur. Also, the waffle-maker portion is within the self-cleaning oven portion in an upper location for convenient access during batter pouring subject to excess batter elimination during self-clean electric oven energization at high temperature.

Another object of this invention is to provide a self-cleaning electric oven compartment in combination with a waffle-maker portion directly therein in a predetermined bottom location where a complementary waffle cover is movable as to a waffle bottom portion adjacent to heating element means of the oven portion. Upon opening of oven door means access is gained to the self-cleaning oven compartment as well as the waffle maker portion which remains therein. Any excess waffle batter spilled and/or subject to overflow is simultaneously disintegrated during high temperature self-cleaning electric oven operation for such purpose.

Further objects and advantages of the present invention will be apparent from the following description, reference being had to the accompanying drawings wherein preferred embodiments of the present invention are clearly shown.

In the drawings:
FIGURE 1 is a frontal plan view of multiple domestic appliance combination features in accordance with the present invention.

Figure 1:
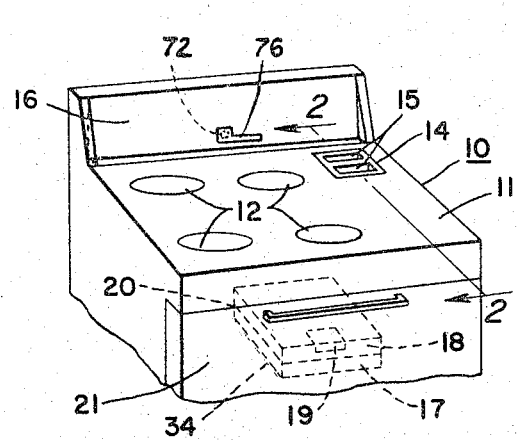

In FIGURE 1 there is shown a multiple domestic appliance combination generally indicated by numeral 10. This combination includes a cooking top or plate portion 11 having a plurality of surface cooking units 12 electrically energizable in a well known manner. Reference is made to Patent 3,116,397, Clark issued Dec. 31, 1963, to the assignee of the present invention on a thermally responsive control device for surface cooking units. Also, suitable surface cooking units are disclosed by Patent 3,167,638, Hornaday et al. issued January 26, 1965, to the assignee of the present invention. The combination shown in FIGURE 1 further includes a toaster portion 14 having at least a pair of slots or access apertures 15 thereto. The toaster portion 14 as shown in FIGURE 1 is located to one side and rearwardly adjacent to a console portion or control panel 16 of the combination structure 10. Reference is made to a copending application Ser. No. 494,637 filed concurrently herewith concerning combination toaster and electric self-cleaning oven means belonging to the assignee of the present invention and having a centrally located toaster portion illustrated therewith.

Figure 2:
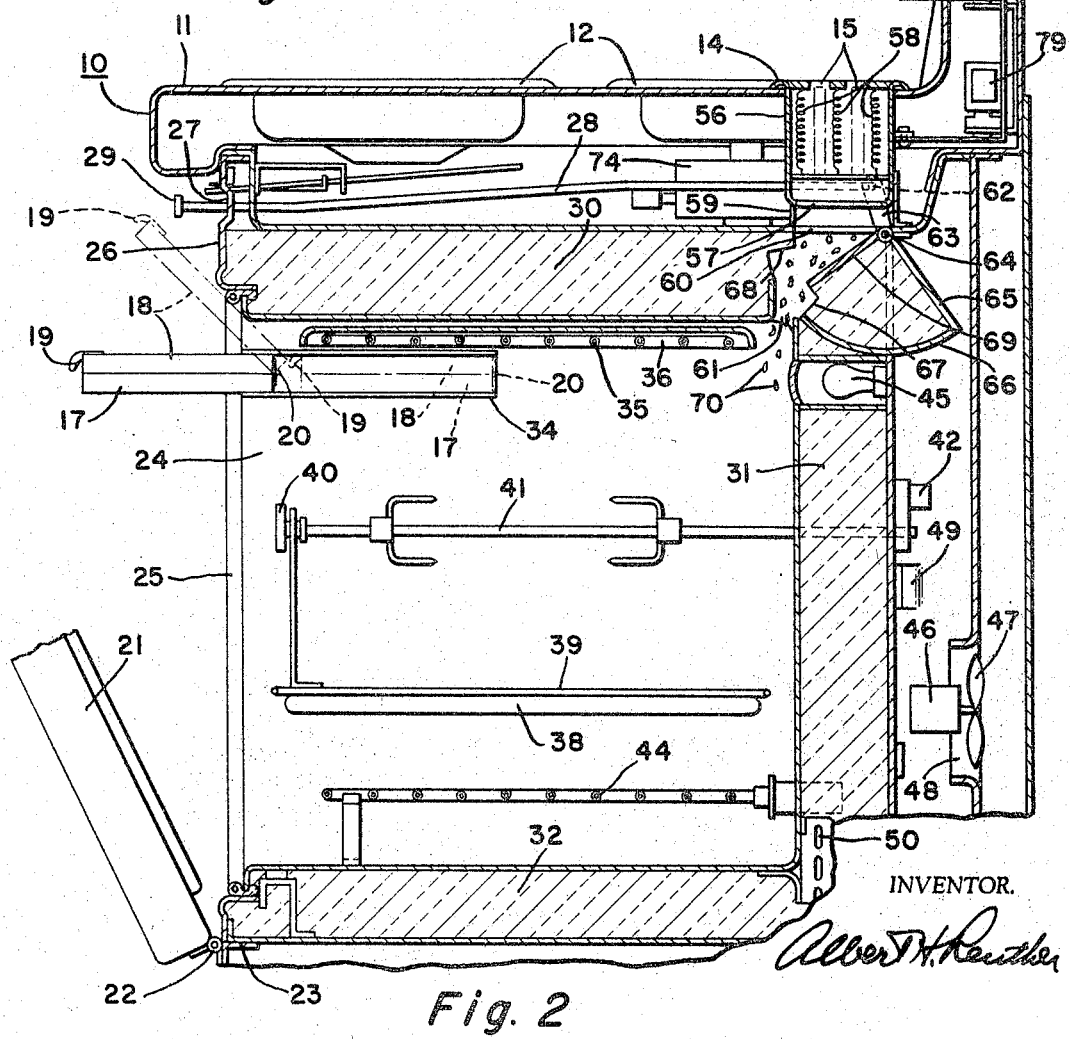
FIGURE 2 is a fragmentary cross-sectioned elevational view of multiple domestic appliance combination features taken along line 2—2 in FIGURE 1.

Also in FIGURE 1, the multiple domestic appliance combination 10 is shown including a waffle-maker portion having a base 17 as well as a cover 18 therewith. The cover 18 includes a handle portion 19. A suitable hinge or pivot means 20 shown in FIGURE 2 is provided between the base 17 and cover 18 adjacent to one edging thereof. It is to be understood that the waffle-maker portion illustrated in the drawings includes suitable internal heating elements electrically energizable from a power source (not shown). Also the heating element means as mounted internally of the waffle-maker base portion at least includes heat-resistant insulation padding therein to withstand relatively high temperatures up to at least 1,000° F. The base and cover of the waffle-maker portion is made of heat-resistant metal exemplified by high temperature steel.

As represented in views of FIGURES 1 and 2, the domestic appliance combination 10 includes a door means 21 having a hinge portion or pivotal means 22 secured to frame structure 23. The oven portion of the domestic appliance combination includes an oven compartment 24 having an opening thereto around which a suitable heat-resistant resilient sealing strip 25 is provided. This sealing strip 25 fits adjacent to an upper frame portion or support 26 having a recessing 27 located therein. A push-pull plunger or actuator means 28 having a control knob end 29 is movable as to this support 26 such that when the oven door means 21 is closed the knob end 29 is in the recessing 27 of the support 26.

The oven compartment 24 is surrounded by insulated liner means including an upper portion 30 as well as a rear wall portion 31 and a bottom portion 32 as well as insulated opposite side wall portions. The oven door means 21 also has suitable insulation packing therein. Metal paneling of the insulated liner means for the oven includes a pair of opposite track means 34 located below the top portion 30 and below a broiler heating element portion 35 which is centrally recessed if necessary and having a shield means 36 adjacent thereto. The track means 34 permits the waffle portion including base 17 and cover 18 thereof to be moved back and forth into extended and retracted positioning represented in FIGURE 2 of the drawings. When the waffle-maker portion is pulled forward and outwardly, the cover 18 thereof can be pivoted upwardly for easy access and pouring of waffle batter onto irregular or squared waffle-making plates in a well known manner. Once the waffle batter has been added onto the plate structure of the base 17 the cover 18 is closed and the waffle-maker portion is again pushed into the upper location in the oven compartment 24. It is to be understood that suitable electrical energization for the waffle-maker portion is provided including an on-off switch means connected to a power source (not shown). The on-off switch means can be provided on the console portion 16 and also it is possible to have the waffle-maker portion switching dependent upon return thereof into the oven-compartment of the domestic appliance combination range structure therewith. Reference is made to a Patent 3,132,231, Montgomery, issued May 5, 1964, to the assignee of the present invention concerning track structure for sliding a member in and out of predetermined positioning.

The oven compartment 24 further has embossments 38 on opposite sides of the oven liner means such that removable shelves such as 39 are slidably positioned thereon. A rotisserie usable with this oven may comprise a spit 40 having a shaft 41 rotatably driven by a rotisserie motor 42 that is also suitably electrically energized. Reference is made to a Patent 2,821,903, Allen, Jr., et al., issued Feb. 4, 1958, to the assignee of the present invention concerning rotisserie features.

Broiling operation of the heating element 35 whenever a suitable thermostat control knob therefore (not shown) is in the broil position is in accordance with teachings of Fry Patents 2,790,056 and 2,828,399, issued Apr. 23, 1957, and Mar. 25, 1958, respectively.

A bake heating element 44 is mounted adjacent to a bottom of the oven compartment 24. Illumination of the oven compartment 24 is provided by an electrically energizable light bulb means 45 interconnected with a power supply through a suitable door switch in a well known manner. Reference is made to Baker Patent 2,962,575, issued Nov. 29, 1960, which is representative of a temperature controller commercially available from the King-Seeley Thermos Company. A suitable switch and variable resistance temperature sensing system for the oven and energization of the baking heat element 44 is accordingly provided. A blower means 46 with an impeller or fan blade portion 47 in a suitable opening 48 of an inner rear wall structure is provided to draw outside air into the space surrounding the insulated oven liner means. The air from the outside is drawn in through lanced out openings 49 in each of the side walls between side insulation retainer means and outer walls of the structure. The cooking unit openings 12 provide space for exhausting the cooling air from the range. Also, a plurality of slots 50 are provided for minimizing heat conduction between the oven liner means and a support wall thereof. Suitable ceramic spacers (not shown) also can be provided for the oven liner means to serve to minimize heat flow.

As an additional auxiliary appliance other than the primary waffle-maker portion with the self-cleaning oven means the toaster portion 14 has a body shell 56 with an opening 57 below the heating element means 58 of the toaster portion. As to heating elements 58 of the toaster portion and operation thereof, reference is made to disclosure of Patent 2,197,221, Koci, issued Apr. 16, 1940, Patent 2,361,446, Anderson, issued Oct. 31, 1944, Patent 2,459,169, Koci, issued Jan. 18, 1949, and Patent 2,459,170, Koci, issued Jan. 18, 1949, all cited as being examples of toaster control mechanism suitable for use in the shell 56.

A rectangular housing extension 59 is provided from the toaster shell 56 to a cutout 60 in the oven liner means structure. This cutout 60 communicates with a chute or passage forming means 61 adapted to be opened and closed in response to push-pull actuation of the plunger means or actuator 28. A transverse pin 62 of the actuator 28 has pivotal engagement with an arm or lever 63 secured as a bell crank to one end of a shaft 64. The shaft 64 is suitably journalled as to the liner means structure and carries an insulated segment 65 having an arcuate side portion 66 as well as a step or corner 67 complementary to a shoulder 68 of the oven liner means. When the actuator 28 is pushed inwardly such that the knob 29 is in the recess 27, the bell crank arm 63 effects pivotal movement of the insulated segment 65 into a closed positioning such that the opening 60 and a top 69 of the segment is the bottom of the toaster portion. On the other hand when the knob 29 is pulled out as shown in FIGURE 2, the passage 61 is opened to permit consumable materials or particles 70 to drop therethrough directly into the self-cleaning oven compartment. Such consumable materials including crumbs, bread crust and the like are disintegrated during high temperature operation of the self-cleaning oven means in a range between 850° F. and 950° F. Reference is made to a disclosure of copending application S.N. 402,803, Alexander, filed Oct. 9, 1964, concerning an oven temperature control method using low voltage thermal relays for an electric self-cleaning oven means. A suitable knob 72 is provided as represented in FIGURE 2 for stop, cook, and clean settings of the control circuitry set forth in this copending application. Also, a catalytic oxidizing unit 74 is provided for the self-cleaning oven means in accordance with a disclosure of copending application S.N. 441,759, Allen, Jr., et al., filed Mar. 22, 1965, belonging to the assignee of the present invention. A latch means 76 is provided together with a solenoid or coil 78 and a latching mechanism 79 for an interlock or latch and control system on a self-cleaning oven means in accordance with a disclosure of copending application S.N. 391,559, Martin, et al., filed Aug. 24, 1964, belonging to the assignee of the present invention.

Figure 3:
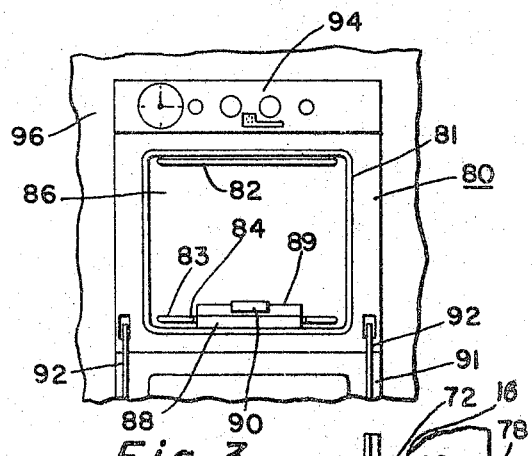
FIGURE 3 is a frontal view of combination waffle-maker and self-cleaning oven means also having features in accordance with the present invention.

In FIGURE 3 there is shown another multiple domestic appliance combination generally indicated by numeral 80 including a self-cleaning oven means 81 having a broiler heating element 82 as well as a bake heating element 83. The bake heating element 83 is centrally recessed at 84 into a substantially U-shaped configuration such that a heating compartment 86 of the oven means has a waffle-maker portion therein including a base 88 as well as a pivotal cover 89 thereon and a handle 90 similar to that identified by reference numerals 17–18–19 respectively in FIGURES 1 and 2 of the drawings. A door means 91 for the self-cleaning electric oven is suitably journalled with links 92 therewith. The self-cleaning oven portion has suitable insulation in the oven liner wall structure and a multi-knob control panel 94 is provided. The domestic appliance combination 80 of FIGURE 3 is capable of being mounted in a recess of a partition or wall 96 of a home or apartment. The waffle-maker portion in FIGURE 3 is thus at a level readily accessible for pouring waffle batter therein when the cover 89 is raised. The spilled waffle batter and/or overflow thereof is readily disintegrated during a cycle of high temperature self-cleaning electric oven operation as noted earlier. In addition to a wall mounting of the combination in FIGURE 3, it is noted that a Patent 3,096,755, Milburn, issued July 9, 1963 to the assignee of the present invention represents another vertical oven structure with which the waffle-maker portion is usable in combination. The waffle-maker portion in FIGURE 3 also has suitable insulation around internal heating elements and a heat resistant steel is used for the cover 89 and base 88 thereof.

Reference is made to a Patent 2,224,945, Ames issued Dec. 17, 1940, concerning further disclosure of self-cleaning electric cooking apparatus per se. The combination waffle-maker and/or toaster and self-cleaning oven means in accordance with the present invention is particularly advantageous in kitchens where space is at a premium such that the multiple domestic appliance combination serves multiple purposes. The waffle-batter excess, crumbs and/or particles disintegrate during high temperature oven cleaning cycle operation. The push-pull mechanism is operable only when the oven door means is opened and must be in a closed position for simultaneously properly positioning auxiliary appliance components when the oven door means is closed.

While the embodiments of the present invention as herein disclosed constitute preferred forms, it is to be understood that other forms might be adopted.

What is claimed is as follows:

1. A multiple domestic appliance combination, comprising, an electric self-cleaning oven means having an insulated oven door and wall means, auxiliary small appliance means including at least a waffle-maker portion with a base and cover movable therewith, said waffle-maker portion having a location within said electric self-cleaning oven means so that manual cleaning away of spilled waffle batter is avoided due to periodic high temperature operation of said electric self-cleaning oven means.

2. The combination of claim 1 wherein said wall means include tracking in a predetermined location whereby said waffle-maker portion is slidable into and out of said electric self-cleaning oven means.

3. The combination of claim 2 wherein said waffle-maker portion has a top central location in said self-cleaning oven means and is thereby readily accessible for pouring waffle batter thereto when pulled out of said self-cleaning oven means along said tracking, said cover being readily raised and lowered when said waffle-maker portion is pulled out.

4. The combination of claim 2 wherein a hook-shaped handle is carried by said cover both for transmittal of in and out sliding force as well as for opening and closing of said cover to one side of a self-cleaning oven means, said oven door when closed requiring return of said waffle-maker portion into said self-cleaning oven means.

5. The combination of claim 1 wherein said auxiliary appliance means includes an electric toaster portion in addition to said waffle-maker portion, and a movable insulated segment of oven wall means is provided at a bottom location of said electric toaster portion.

6. The combination of claim 5 wherein said insulated segment has linkage thereto for transmittal of pivotal force and has an arcuate surfacing having a step-like abutment located to complement the oven wall means when in closed position and in open position to form a chute passage directly from said toaster portion into said self-cleaning oven means which when operated at high temperature accomplishes simultaneously the oven cleaning as well as disintegration of both excess waffle batter and consumable material from said toaster portion.

7. The combination of claim 6 wherein said self-cleaning oven means also has a rotisserie and broiler heating element located intermediate said toaster portion and said waffle-maker portion.

8. The combinaton of claim 5 wherein a recessing is provided in oven structure for positioning a knob end of a push-pull actuator for said movable insulated segment.

9. The combination of claim 5 wherein said electric toaster portion is located to one side of center of a cooking top and to one side of center location of said waffle-maker portion also with said electric self-cleaning oven means.

10. In combination, comprising, an electric self-cleaning oven means having an insulated oven door and wall means, broiler and bake heating elements provided in said oven means in predetermined locations with at least one thereof being centrally offset, and a waffle-maker portion including a base and cover movable into closed and open positions as to waffle batter poured thereto, said waffle-maker portion having a central lower location in said electric self-cleaning oven means.

11. The combination of claim 10 wherein said waffle-maker portion cover has a hook-shaped handle at a readily accessible forward location within said self-cleaning oven means.

12. An electric range including a cooking top as well as a control console having a selector and door latch lever for an electric self-cleaning oven means included therein, a waffle-maker portion in said self-cleaning oven means, an electric toaster portion having a housing with a top access and a bottom passage directly connected to the oven means, said toaster portion having plural heating elements electrically energizable above the passage through which consumable material including crumbs, bread crusts, and burned particles may drop into said oven means, and a movable insulated oven liner segment which complements said oven means as well as said bottom passage from said toaster portion subject to closure during high temperature oven operation, said segment having a pivotal mounting and a push-pull actuator connected thereto, said actuator having a knob end located below the cooking top and between said top and said waffle-maker portion, the knob end being further located behind an upper peripheral edging of an oven door recessing so that oven door closure assures simultaneous closure of the passage between said toaster portion and said electric self-cleaning oven means.

13. The combination of claim 12 wherein said waffle-maker portion is reciprocably mounted to slide in and out of predetermined positioning though necessarily inside said self-cleaning oven means upon door closure.

14. A multiple domestic appliance combination range, comprising, a cooking top as well as an electric self-cleaning oven means, a waffle-maker portion and toaster portion supplemental to said self-cleaning oven means, said toaster portion having a bottom floor area which is displaceable simultaneously with shift of an oven insulation segment so that consumable particles drop directly from said toaster portion into said electric self-cleaning oven means, said waffle-maker portion being within said self-cleaning oven means subject to high temperature operation during which excess spilled waffle batter and toast crumbs disintegrate into ash.

15. The combination range of claim 14 wherein high temperature operation occurs in a range between 850° F. and 950° F. during oven door latch interlock and simultaneous necessary confinement of said waffle-maker portion therein as well as maintenance of passage closure between said toaster portion and said electric self-cleaning oven means.

References Cited

UNITED STATES PATENTS

| | | | |
|---|---|---|---|
| 1,989,933 | 2/1935 | Kahn | 126—19 |
| 2,247,626 | 7/1941 | Ames | 219—391 |
| 2,504,445 | 4/1950 | Paunica | 99—331 |
| 2,617,008 | 11/1952 | Ames | 219—395 |
| 2,702,848 | 2/1955 | Scofield et al. | 219—444 |

FOREIGN PATENTS 1,376,149  9/1964  France.

BILLY J. WILHITE, *Primary Examiner.*